3,365,519
OLEFIN POLYMERS CONTAINING GRAFT CO-
POLYMERS OF AZIRIDINES ONTO POLYOLE-
FIN SUBSTRATES
Donald J. Endsley, Clute, Tex., assignor to The Dow
Chemical Company, Midland, Mich., a corporation of
Delaware
No Drawing. Filed Feb. 5, 1965, Ser. No. 430,745
6 Claims. (Cl. 260—897)

ABSTRACT OF THE DISCLOSURE

An adhesive composition made up of a blend of a polymer consisting of a hydrocarbon homopolymer or a copolymer of a hydrocarbon monomer with a polar monomer and a graft copolymer comprised of a copolymer substrate of at least 50 percent by weight of an α-olefin and unsaturated monocarboxylic acids, alkyl esters of the same and vinyl esters of monocarboxylic acids, with a polymerized aziridine.

An example of the composition is a blend of polyethylene with a copolymer of ethylene/acrylic acid having grafted thereon polyethylenimine. The blend adheres strongly to various substrates such as metals, wood, fabrics, and other plastics such as Mylar.

---

The present invention relates to hydrocarbon polymers and, in particular to cross-linkable hydrocarbon polymers having improved adhesive properties.

Polyethylene and related hydrocarbon polymers and copolymers as is well known, commonly have a smooth and sleek, relatively slippery and wax-like surface which is poorly adapted to provide for suitable adhesion or anchorage of applied materials by mere physical attachment. In addition, the relatively inert chemical nature of these polymers resists the efficient attachment of most materials by chemical interlinkage or bonding. Because of the poor bonding properties of ethylene polymers, much difficulty has been encountered in laminating the polymer to substrates such as paper, nitrocellulose, wood, poly(ethylene terephthalate), poly(vinylidene chloride), aluminum and the like.

According to the present invention cross-linkable hydrocarbon polymers having improved adhesion are obtained by blending the hydrocarbon polymer with a graft copolymer of an aziridine monomer on an olefin copolymer substrate.

The hydrocarbon polymer may be blended in any proportion with the aziridine/olefin copolymer graft copolymer, although blends comprised of about 50 to about 90 percent by weight of the hydrocarbon polymer and about 10 to 50 percent by weight of the aziridine/olefin copolymer graft copolymer are preferred.

The aziridine/olefin copolymer graft copolymer compositions employed in the formation of the modified hydrocarbon polymers of the present invention are more fully described in my copending application Serial Number 430,746 filed concurrently with the present application. In general, the graft copolymers may be theoretically represented in the following structural illustration:

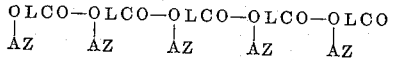

wherein the interlinked "OLCO" symbols represent the olefin copolymer substrate or trunk and the symbols "AZ" connected thereto represent the substituent graft copolymer branches of the aziridine monomer provided thereon.

The olefin copolymer substrate of the graft copolymer is comprised of solid copolymers obtained by known procedures by polymerizing (a) at least 50 percent by weight of an alpha-olefin having 2 to 10 carbon atoms and
(b) at least one other polymerizable compound selected from polar monomers such as
  (1) an α,β-ethylenically unsaturated monocarboxylic acid having 3 to 7 carbon atoms,
  (2) an alkyl ester of the acid (1) wherein the alkyl portion contains from 1 to 8 carbon atoms and
  (3) a vinyl ester of a monocarboxylic acid.

Typical examples of alpha olefins which may be used to prepare the olefin copolymer substrates include ethylene, propylene, butene-1, pentene-1, heptene-1, 3-methyl-butene-1, 4-methylpentene-1, octene-1 and the like.

Representative examples of α,β-monoethylenically unsaturated monocarboxylic acids which may be copolymerized with the alpha olefins to prepare the olefin copolymer substrates of the graft copolymers employed in the present invention include acrylic acid, methacrylic acid, ethacrylic acid, crotonic acid, isocrotonic acid, tiglic acid and angelic acid. Among these, acrylic acid is preferred.

Suitable examples of alkyl esters of the α,β-monoethylenically unsaturated monocarboxylic acids which may be copolymerized with the alpha olefins to prepare the olefin copolymer substrates of the graft copolymers employed in the present invention include methyl acrylate, methyl methacrylate, ethyl acrylate, ethyl methacrylate, propyl acrylate, isobutyl acrylate, cyclopentyl acrylate and the like.

Typical examples of vinyl esters of monocarboxylic acids which may be copolymerized with the alpha olefins to prepare the olefin copolymer substrates of the graft copolymers employed in the present invention include vinyl acetate, vinyl propionate, vinyl butyrate, vinyl isobutyrate, vinyl octoate, vinyl cyclopentonate, vinyl benzoate and the like.

The graft copolymer compositions which are incorporated in the hydrocarbon polymer contain a major portion of the olefin polymer trunk or substrate that has been modified with the substituent aziridine graft copolymer groups chemically attached thereto. The graft copolymer is generally comprised of at least 80 percent by weight of the olefin copolymer substrate, and it is preferred that the graft copolymer composition be comprised of from about 80 to about 90 percent by weight of the olefin copolymer substrate.

The aziridine monomers which are utilized to modify the olefin copolymer substrates so as to provide the graft copolymer composition of the present invention are represented by the formula

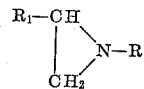

wherein R is hydrogen or a hydroxyalkyl radical containing 1 to 4 carbon atoms or an aminoalkyl radical containing 1 to 4 carbon atoms and $R_1$ is hydrogen or an alkyl group containing 1 to 4 carbon atoms.

Suitable examples of aziridine monomers which may be graft polymerized on the olefin copolymer substrate include ethylenimine, alkyl substituted ethylenimines such as 2-methyl-ethylenimine, 2-propyl-ethylenimine, 2-butyl-ethylenimine, N-substituted hydroxyalkyl or aminoalkyl ethylenimines such as N-(2-hydroxyethyl)ethylenimine, N-(2-hydroxypropyl)ethylenimine, N-(2-aminoethyl)ethylenimine, N-(2-aminopropyl)ethylenimine, N-(2-aminobutyl)ethylenimine and the like.

The graft copolymers of the present invention are prepared by contacting the olefin copolymer substrate with the aziridine monomer in any desired manner.

In one preferred method, the olefin copolymer is immersed in a treating bath containing the aziridine monomer and the bath is heated to a temperature of about 60° to 90° C. for periods of time ranging from 2 or more hours.

The hydrocarbon polymers to which the graft copolymers are added comprise, in general, all thermoplastic hydrocarbon polymers obtained by the polymerization of monoolefins having the general structure $CH_2=CHR$, where R is a hydrogen or an alkyl radical. In general, the alkyl radical contains not more than 8 carbon atoms. In particular, the invention is applicable to polyethylene, both the high density type and the low density type, polypropylene, polybutene-1, poly(3-methylbutene), poly-(4-methylpentene), and copolymers of ethylene with α-olefins, propylene, butene-1, octene-1, decene-1, octadecene-1, etc. The term "hydrocarbon polymer" is also intended to include modified polyolefins which contain about 3 to about 35 percent by weight of polar monomers as above defined including α,β - monoethylenically unsaturated monocarboxylic acids having 3 to 7 carbon atoms including acrylic and methacrylic acid, alkyl esters of said acids wherein the alkyl portion contains from 1 to 8 carbon atoms such as methyl acrylate, ethyl acrylate, isobutyl acrylate and vinyl esters such as vinyl acetate and the like.

The hydrocarbon polymer and the aziridine/olefin copolymer graft copolymer are blended in any manner which produces a homogenous mixture. Thus, the graft copolymer is added to the hydrocarbon polymer in a rubber compounding mill, in a Banbury mixer or a mixing extruder in which the graft copolymer is uniformly distributed throughout the hydrocarbon polymer. The mixing operation is carried out at a temperature above the melting point of the polymer. It is also feasible to blend the two polymers in the solid state and then cause the uniform distribution of the graft copolymer resin in the melt extruder employed in the fabrication, by providing a mixing section with a suitable mixing torpedo in the extruder.

The modified hydrocarbon polymer blends of the present invention may be heat formed into shaped articles such as films, tubes, rods, sheets, tapes, ribbons and the like by any described technique adapted for such purpose with conventional polymers such as extrusion, molding and the like. The blends are particularly useful as adhesives, e.g. in the preparation of laminates, and may be coated on diverse surfaces such as paper, wood, poly(ethylene terephthalate), nitrocellulose, metals such as aluminum and related materials. Laminates prepared from the blends of the present invention are extremely resistant to delamination and are superiod to laminates similarly prepared from the unmodified hydrocarbon polymer. The blends of the present invention may also be cross-linked by the application of elevated temperatures to provide tough abrasion and solvent resistant coatings for plastic and metal substrates.

To illustrate the manner in which the invention may be carried out, the following examples are given. It is to be understood, however, that the examples are for the purpose of illustration and the invention is not to be regarded as limited to any of the specific materials or conditions recited therein.

EXAMPLE 1

*Preparation of graft copolymer of ethylenimine on ethylene/acrylic acid copolymer substrate*

Into a reaction vessel equipped with a means for stirring, temperature control, refluxing, reactant addition and purging were added 34 pounds isopropanol, 3.4 pounds of water and 40 pounds of a pelletized ethylene/acrylic acid copolymer having an acrylic acid content of 8 percent by weight and a melt index of 6 decigrams/10 minutes (according to ASTM D1238–57T). The temperature of the reaction vessel was raised to 85° C. and 3.06 pounds of ethylenimine was added over a 30-minute time period. At the end of this period, the reactants were digested for 8 hours at 85° C. whereupon a vacuum was placed on the reaction vessel and the unreacted ethylenimine was removed. The pellets were water washed and dried at 25° C.

The product was a graft copolymer consisting of 6.3 percent by weight ethylenimine chemically combined with 93.7 percent of ethylene/acrylic copolymer per 100 parts by weight of the graft copolymer, hereafter designated as aziridine graft copolymer.

*Preparation of blend of graft copolymer of ethylenimine on ethylene/acrylic acid substrate and polyethylene*

A mixture of 80 parts of a polyethylene having a melt index of 20 decigrams/10 minutes (ASTM D1238–57T) and 20 parts of the aziridine graft copolymer was heated on a roll mill at 350° F. until a uniform blend was obtained (about 15 minutes compounding time). The molten mixture was then sheeted off.

The blend product exhibited excellent adhesion to poly(ethylene terephthalate) substrates whereas unmodified polyethylene exhibited little or no adhesion properties.

The blend product was also found to cross-link upon heating at elevated temperatures, as indicated by the decrease in melt index of the product as heating is continued. The blend when heated for six minutes at 190° C., had a melt index of 8.6 grams/10 minutes according to ASTM D1238–57T and a melt index of 8.0 after 10 minutes heating at this temperature.

EXAMPLE 2

A blend of 20 parts of the aziridine graft copolymer of Example 1 and 80 parts of an ethylene/vinyl acetate copolymer having a melt index of 30 grams/10 minutes (ASTM D1238–57T) and containing 35 percent by weight vinyl acetate was prepared by mixing the components on a roll mill at 350° F. for 10 minutes following the procedure of Example 1.

The resultant blend had excellent adhesion to sheets of poly(ethylene terephthalate), aluminum, wood and fabric, whereas the unmodified ethylene/vinyl acetate copolymer exhibited little or no adhesion to these substrates.

EXAMPLE 3

A blend of 17 parts of the aziridine graft copolymer of Example 1 and 83 parts of an ethylene/vinyl acetate copolymer having a melt index of 30 grams/10 minutes (ASTM D1238–57T) and containing 35 percent by weight vinyl acetate was prepared by mixing the components on a roll mill at 350° F. for 10 minutes following the procedure of Example 1. Good adhesion of the blend product to poly(ethylene terephthalate) and aluminum substrates was obtained.

The blend product was also found to cross-link upon heating at elevated temperatures, as indicated by the decrease in melt index of the product as heating is continued. The melt index of the blend product after heating at 190° C. for varying time intervals is summarized in Table I below:

*Table I*

| Heating time at 190° C. (minutes): | Melt Index (ASTM D1238–57T) g./10 minutes |
|---|---|
| 2 | 12.5 |
| 5 | 9.9 |
| 8 | 6.2 |

EXAMPLE 4

A blend of 15 parts of the aziridine graft copolymer of Example 1 and 85 parts of an ethylene/ethyl acrylate copolymer having a melt index of 20 grams/10 minutes and containing 20 percent by weight ethyl acrylate was prepared by mixing the components on a roll mill at 350° F. for 10 minutes following the procedure of Example 1.

The blend product adhered strongly to poly(ethylene terephthalate) and aluminum substrates. The unmodified ethylene/ethyl acrylate copolymer would not adhere to any substantial degree to either poly(ethylene terephthalate) or aluminum substrates.

Results similar to foregoing may also be obtained when graft copolymers prepared from any other mentioned aziridine monomers on other varieties of olefin copolymer substrates are blended with the above mentioned hydrocarbon polymers.

What is claimed is:
1. A composition having improved adhesion properties comprised of a blend of about 50 to about 90% by weight of a solid hydrocarbon polymer selected from the group consisting of homopolymers of monoolefins having the formula $CH_2=CHR$, where R is selected from the group consisting of hydrogen and alkyls of 1–8 carbon atoms; interpolymers of the above monoolefins with each other, copolymers of the above monoolefins with $\alpha,\beta$-monoethylenically unsaturated monocarboxylic acids having 3–7 carbon atoms; copolymers of the above monoolefins with alkyl esters of $\alpha,\beta$-monoethylenically unsaturated monocarboxylic acids having 3–7 carbon atoms wherein the alkyl group has 1–8 carbon atoms; and vinyl esters of monocarboxylic acids and about 10 to about 50% by weight of a solid graft copolymer comprised of
(1) a copolymer substrate of
  (a) at least 50 percent by weight of an alpha monoolefin having 2 to 10 carbon atoms and
  (b) at least one other polymerizable compound selected from the group consisting of
    (i) an $\alpha,\beta$-ethylenically unsaturated monocarboxylic acid having 3 to 7 carbon atoms,
    (ii) an alkyl ester of the acid (i) wherein the alkyl portion contains from 1 to 8 carbon atoms and
    (iii) a vinyl ester of a monocarboxylic acid, said copolymer substrate having chemically attached thereto, as graft copolymerized substituents thereon,
(2) a polymerized aziridine monomer, said monomer being represented by the formula

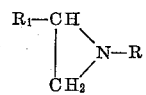

wherein R is selected from the group consisting of hydrogen, hydroxyalkyl radicals containing 1 to 4 carbon atoms, and aminoalkyl radicals containing 1 to 4 carbon atoms and $R_1$ is selected from the group of consisting of hydrogen and alkyl groups containing 1 to 4 carbon atoms, said substrate comprising from about 80 to about 90% by weight of the graft copolymer.

2. The composition of claim 1 wherein the hydrocarbon polymer is polyethylene.

3. The composition of claim 1 wherein the hydrocarbon polymer is a copolymer of ethylene and ethyl acrylate.

4. The composition of claim 1 wherein the hydrocarbon polymer is a copolymer of ethylene and vinyl acetate.

5. The composition of claim 1 wherein the graft copolymer substrate is a copolymer of ethylene and acrylic acid.

6. The composition of claim 1 wherein the aziridine monomer graft copolymerized on the copolymer substrate is ethylenimine.

References Cited
UNITED STATES PATENTS

| | | | |
|---|---|---|---|
| 3,154,479 | 10/1964 | Muroi et al. | 204—154 |
| 3,201,374 | 8/1965 | Simms | 260—80.5 |
| 3,201,498 | 8/1965 | Brunson et al. | 260—897 |
| 3,230,029 | 1/1966 | Cappuccio et al. | 8—55 |
| 3,245,931 | 4/1966 | Matthew | 260—897 |

GEORGE F. LESMES, *Primary Examiner.*

MURRAY TILLMAN, *Examiner.*

T. G. FIELD, *Assistant Examiner.*